United States Patent [19]
Marzetta

[11] 3,878,728
[45] Apr. 22, 1975

[54] THERMESTHESIOMETER

[75] Inventor: Louis A. Marzetta, Gaithersburg, Md.

[73] Assignee: The United States of America as represented by the Secretary of the Department of Health, Education and Welfare, Washington, D.C.

[22] Filed: Oct. 18, 1973

[21] Appl. No.: 407,532

[52] U.S. Cl. .......................... 73/432 SD; 73/15 R
[51] Int. Cl. ........................................ G01n 25/00
[58] Field of Search ............... 73/1 F, 15 R, 432 SD

[56] References Cited
UNITED STATES PATENTS

| | | | |
|---|---|---|---|
| 2,998,720 | 9/1961 | Williams et al. | 73/432 SD X |
| 3,540,283 | 11/1970 | Dean | 73/362 AR |
| 3,688,558 | 9/1972 | Tixier | 73/15 R |
| 3,688,580 | 9/1972 | Jarzembski | 73/361 |
| 3,690,175 | 9/1972 | Butts | 73/432 SD X |

Primary Examiner—S. Clement Swisher
Assistant Examiner—Frederick Shoon
Attorney, Agent, or Firm—Browdy and Neimark

[57] ABSTRACT

A thermesthesiometer for indicating the temperature that would be experienced if human contact were made with a hot surface comprising a probe member formed from an elastomer having a thermal inertia substantially equal to that of human skin and capable of withstanding temperatures of approximately 200°–300° C. A temperature controlling circuit is disposed in the bulk of the elastomer to maintain its internal temperature substantially equal to that of the human body, and temperature measuring means are disposed beneath the probe face at a distance substantially equal to that of the basal layer or the epidermis-dermis interface of human skin, which layer is sensitive to thermal damage. The instrument also includes means for displaying the measured contact or interface temperature at a predetermined time, such as 1, 2, 4, 8 or more seconds, after the probe is placed in contact with a hot object.

8 Claims, 11 Drawing Figures

THERMESTHESIOMETER

FIELD OF THE INVENTION

The present invention relates to an instrument that measures and indicates the temperature that would be experienced if human contact were made with a heated surface and, more particularly, to such a device which permits the correct value of interface contact temperature to be calculated for a selected contact time without knowing the composition or temperature of the heated material.

BACKGROUND OF THE INVENTION

Prior art instruments for making burn hazard calculations have measured the heat of an object in one of two ways. One technique is calorimetry or the time integration of heat flow. Using this technique the temperature rise of an ideally contained mass of unknown specific heat can be precisely related to the time integration of the heat flow rate. The major problem with this technique is instrumenting this basic concept of heat physics. Since all of the factors in the calculation have a one to one correspondence with the measured temperature rise, every factor in the calculation must be accurately known. Also, since the application of such a technique would necessitate dealing with a small quantity of transferred heat in a short period of time, it would be necessary to use an extremely small calorimeter in order to obtain a sizable temperature rise while maintaining adequate resolution and accuracy. Furthermore, this technique involves a substantial calibration procedure for the transducer.

The second technique involves measuring the time derivative of heat flow. Unlike electric charges in motion, the flow of heat reveals its presence only as the temperature drops across some physical boundary. The engineering problems associated with heat flow rate transducers are well known and would probably result in less accuracy than the first technique.

Devices utilizing either of these prior art techniques are bulky and are designed for in-laboratory use. Also, such devices have no precision timing feature, thus placing severe restrictions on the applicability of the device. As a result, the prior art devices can not quickly and accurately measure the thermal hazard of shaped hot objects such as stove handles and toys and can not accurately assess the thermal damage that would result from a one second "accidental" contact of human skin with the hot object.

SUMMARY OF THE INVENTION

The shortcomings of the prior art instruments for measuring the human sensibility to heat are satisfactorily overcome by the present invention. Thus, an object of the present invention is to overcome the defects of the prior art, such as indicated above.

Another object is to provide for improved measurement of heat.

Another object of the present invention is to provide an instrument which fills the existing need for a laboratory and field device whose purpose is to establish the degree of hazard that may be present with the hot surface of consumer items.

Another object is to provide a measuring system that is analytically traceable to fundamental constants.

A further object is to provide an instrument for measuring the human sensibility to heat utilizing a transducer that requires no individual calibration.

In furtherance of these and other objects, a principal feature of the present invention is a thermesthesiometer comprising a probe of elastomeric material which conforms to and reliably tests shaped objects such as stove handles and toys. Another feature of the instant invention is that the probe's resiliency duplicates that of human skin. Yet another feature of the instant invention is its ability to measure the temperature which would be experienced by the basal layer of human skin briefly contacting a hot object.

The instant invention is characterized by an instrument equipped with measuring probes for indicating the temperature that would be experienced if human contact were made with a hot surface. The instrument comprises a probe member formed from an elastomer having a thermal inertia substantially equal to that of human skin and capable of withstanding temperatures of about 200° – 300°C. A heater wire and a resistance thermometer are disposed in the bulk of the elastomer to maintain its internal temperature substantially equal to that of the human body, and a temperature measuring thermocouple element is disposed beneath the probe face a distance substantially equal to that of the basal layer of human skin. The instrument may also include a digital readout for visually displaying the measured temperature at a predetermined time, such as 1, 2, 4, 8 or more seconds, after the probe is placed in contact with the hot object. The one second reading is especially desirable because it indicates the temperature which would be reached by the basal layer of the human skin briefly contacting a hot object. After one second contact, human reflex action would result in rapid withdrawal of the skin from the object and, therefore, the amount of thermal damage to the skin would depend on the temperature reached at the basal layer after one second.

BRIEF DESCRIPTION OF THE DRAWING

For a better understanding of the invention, possible embodiments thereof will now be described with reference to the attached drawing, it being understood that these embodiments are to be intended as merely exemplary and in no way limitative.

DETAILED DESCRIPTION

Figure 1:
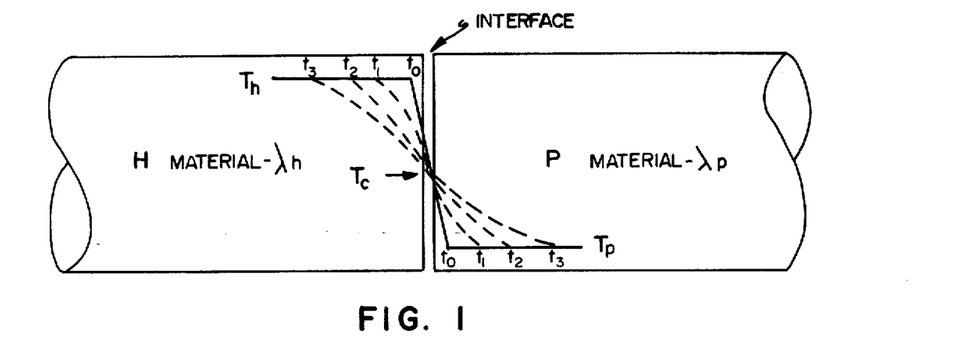
FIG. 1 is a temperature distribution for two semi-infinite bodies in contact.

The complexities of the classical Fourier expressions of multidimensional heat flow are avoided in the present invention. Because of the simple geometry and short measuring time, a one-dimensional heat-flow treatment is valid. Furthermore, the two masses brought into intimate contact can be assumed to be semi-infinite in length, homogeneous, and of initially uniform temperature. Comparative tests also indicate that the contact resistance between the two masses can be neglected. This is also in agreement with the calculation of temperature gradient across thin films using the equation (1) below. Referring now to FIG. 1 the temperature distribution in two solids H and P, at different temperatures $T_h$ and $T_p$, when brought together have characteristics as indicated. It should be noted that at contact time $t_0$, the interface temperature $T_c$ is reached immediately; the value of $T_c$ being constant thereafter. This is an important concept in heat-flow theory that made the present system so advantageous as compared to the time-dependent calorimetry or the gradient-flow approaches discussed hereinabove.

The internal temperature distribution in solid P at initial temperature $T_p$ can be calculated from equation (1) below which is a solution to the Fourier heat-flow equations assuming one-dimensional flow (see Carslaw, H.S., and Jaeger, J.C., *Conduction of Heat by Solids*, 2nd ed., Oxford, London, 1959). The temperature $T_h$ at depth $x$ from the interface and at time $t$ from the instant of contact is given by $$T_h - T_c = (T_p - T_c)\, \mathrm{erf}\,(x/2 \sqrt{\alpha_p t}) \quad (1)$$

where $\alpha_p$ is thermal diffusivity of the P material and $$\mathrm{erf}\,(y) = (2/\sqrt{\pi}) \int_0^y e^{-v^2}\, dv \quad (2)$$

is the error function, a tabulated integral. If the diffusivity $\alpha_p$ is given in square meters per second, then $x$ is in meters and $t$ is in seconds. Also, $\alpha_p = k/\rho c$, with $k$ being the thermal conductivity in units of J/sKm, $\rho$ the density in kg/m³, and $c$ the specific heat in J/kgK. Equation (1) is useful in establishing the temperature in the dermis region of human skin for a stated contact temperature and contact time and penetration depth.

Referring again to FIG. 1, an additional expression can be derived from fundamental heat-flow theory by analysis of the interface region. With the heat from H to P assumed to be at steady state, the interface temperature becomes $$T_c = T_h - \frac{T_h - T_p}{1 + \sqrt{\lambda_h/\lambda_p}} \quad (3)$$

where $\lambda_h$ and $\lambda_p$ are the thermal inertias of solids H and P respectively. Generally, $\lambda = k\rho c$ in units of $J^2/sk^2m^4$.

Equation (3) yields the interface temperature between a probe material P in contact with a heated object H. However, what is really desired is the interface temperature $T_c'$ that would be obtained for human contact with object H. If an analog probe material can be found such that $\lambda_p = \lambda_f$, the thermal inertia of human tissue, and if $T_p = T_f = 33°C$, a typical finger temperature, then $$T_c' = T_h - \frac{T_h - T_f}{1 + \sqrt{\lambda_h/\lambda_f}} \quad (4)$$

Thus, the interface temperature between analog probe and heated surface becomes exactly the temperature produced at the interface by a finger in the same position, that is $T_c = T_c'$.

The validity of this instrumental approach can be checked experimentally. If the thermal inertia $\lambda_h$ is unknown or inconvenient to measure, equations (3) and (4) can be combined to eliminate $\lambda_h$ and yield $$T_c' = \frac{T_h(T_c - T_p)\sqrt{\lambda_p} + T_f(T_h - T_c)\sqrt{\lambda_f}}{(T_c - T_p)\sqrt{\lambda_p} + (T_h + T_c)\sqrt{\lambda_f}} \quad (5)$$

This approach has been used in studies of conduction thermal injuries for human contact with hot mostly metal surfaces (see Griggs, S.L., A Device for the Prediction of Conduction Thermal Injury to Skin, Master of Science Thesis, Massachusetts Institute of Technology, Department of Mechanical Engineering, September 1970). The above approach utilized two different probe materials and solved three simultaneous equations by means of a computer, in order to find $T_c'$. The solution of three combined equations of the form of equation (3) resulted in the elimination of the additional parameter $T_h$, the temperature of the hot object.

The temperature $T_c$ was calculated through a number of experimental measurements and the temperature $T_h$ was carefully measured with a sensitive thermocouple. A variety of materials were used whose thermal properties were reasonably well known. The measured values of the interface temperature $T_c$ in the experimental data were compared to the theoretical value of $T_c$ based on equation (3) with the aid of a calculator. This comparison established that the average error was within 3%.

These experiments showed that $T_c$ could be accurately measured for two different materials with different temperatures when brought into contact. Therefore, it was concluded that an instrument could be designed and based on equation (5) for determining the value of the human contact temperature $T_c'$. Accordingly, tests were conducted for comparing the value of $T_c'$ measurement plus equation (5) and the value of $T_c'$ measured with actual finger contact with the hot surface in question. The procedure involved measuring the interface temperature between the finger and heated surface using a fine-wire thermocouple and, for safety reasons, restricting the experiment to $T_c'$ values below 52°C. The agreement between actual finger measurement and the formula calculation measurement was within 3° for a $T_c'$ in the vicinity of 45°C. However, the tediousness required when working with equation (5) and the required measurement of the hot surface temperature $T_h$ prompted emphasis on development of the analog probe to measure $T_c'$ directly as indicated in equation (4).

The physiological interpretation of the contact temperature $T_c'$ depends on the exposure of the skin surface to heat which causes a rise in tissue temperatures; a sensation of warmth which occurs first, followed by increasing pain, and finally numbness, followed by the destruction of tissue and sensory receptors. These manifestations of heat flow into human tissue are in turn dependent on both the temperature and the exposure time. Since the intended application is concerned with short exposure times, the role of an increased blood flow or the action of sweating can be neglected because they are factors associated with prolonged heating. The primary point of interest in establishing thermal damage is the interface between the epidermis and the dermis, known as the basal layer, located approximately 80 micrometers below the exterior surface of the skin. Experimentation has shown that thermal injury for temperatures between 50° and 74°C is due to the thermal inactivation of tissue elements, and above 72° the destruction can be attributed to protein coagulation or trans-epidermal necrosis. The data of Henriques and Moritz (see Moritz, A.R., and Henriques, F.C., *Studies of Thermal Injury*, American Journal of Pathology, vol. 23, 1947, pp. 531 and 695) are incorporated in the temperature-time diagram shown in FIG. 2. The upper solid line curve is the temperature at which epidermal destruction can be expected as a function of contact time. The lower dotted curve is the threshold of epidermal injury that may be reversible.

Figure 2:
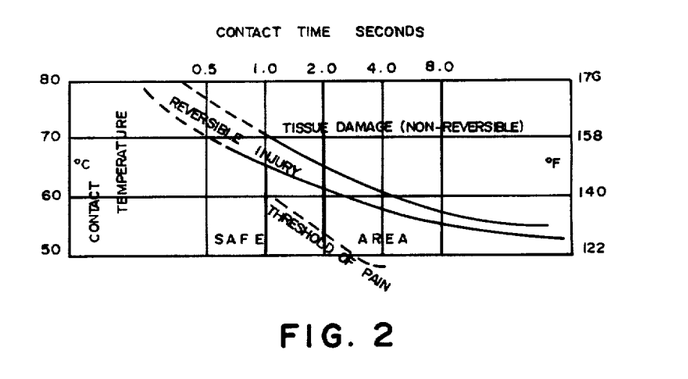
FIG. 2 is a graph showing physiological response curves.

The ordinate values in FIG. 2 are the steady-state surface contact temperatures rather than dermal temperatures; this conforms with the related data found in the references. Actually, for contact times greater than two seconds the difference between the skin surface temperature and the 80 micrometer-depth dermal temperature is within the experimental error for thermocouple measurements. It is in the area of one second contact time that a measurable temperature gradient can appear between the skin surface and dermal region. Knowing the thermal inertia of skin tissue, the temperature at any depth for a specified contact time can be calculated using equations (1) and (2).

For example, given a surface contact temperature of 73°C, the dermal temperature will rise to about 69° in one second, and by 5 seconds the temperature will be within 2° of 73°C. Since the thermocouple at the face of the probe is located at about the depth corresponding to the human dermis layer, the value read at the instrument is close to that temperature the dermis region would reach if human contact were made to the same hot surface. Because the temperature gradient between the surface and the dermis is a function of contact time, the dermal temperature is not constant throughout the contact period. Hence the indicated temperature is slightly higher than the physiologically effective value. Conversely the thermal response lag of the thermocouple element causes the instrument reading to be on the low side. The two errors taken individually are small, and since they have an opposing effect, the net error is almost negligible. An additional aspect of measurement for a one-second contact time will be discussed hereinafter.

The emphasis on a one-second contact stems from the commonly experienced momentary contact with a hot surface followed by the reflex action of fast withdrawal. It has been found that the threshold of pain sensation and reaction is established in about 0.4 to 1.0 seconds, hence the desirability for a short timing-interval at the instrument. The one-second contact time is also unique because the threshold of pain temperature coincides with the skin damage temperature in this time area.

As described above, the premise for an interface temperature invariant with contact time was postulated on tests of objects with semi-infinite lengths. However, many of the heated surfaces presented for examination in practice are likely to be of thin material which is too thin to be considered of semi-infinite length even for a contact time measured in seconds. It is also likely that the material may not be uniform, that is to say it may be fabricated from several layers of different substances. It has been observed that a thin layer of plastic material on a metal surface can cause a dramatic decrease in contact temperature, the decrease being especially noticeable at the one second contact time. Therefore, advantage is taken of the circuit timing control comprising a switch control set to a 1, 2, 4 or 8 second time period which allows measurements to be made for a specific contact period of the probe. As mentioned previously, the measuring time is automatically actuated upon thermal contact between the probe face and the hot surface. At the end of the selected period the last contact temperature reading is "frozen" at the digital panel indicator until released by a manual resetting.

Figure 3:
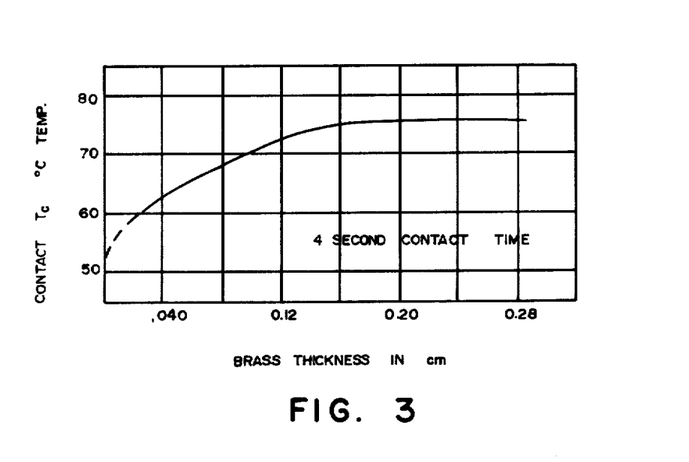
FIG. 3 is a graph showing the effect of thickness on a hot object for a 4 second contact time.

To confirm applicability of the device to measurements on thin materials, several brass sheets of different thickness were uniformly heated to a value of 85°C. The brass samples were placed on a sheet of thermal insulation which in turn was placed over the heat source. The insulation with its relatively low thermal conductivity insured that heat flow during the contact measuring period would be restricted to the brass material. FIG. 3 shows the variation in contact temperature as a function of hot material thickness for four second contact times. For brass plate thicknesses above 0.16 cm, the heated surface can be considered as being of semi-infinite length, as shown in FIG. 3 by the levelling off in contact temperature. Extrapolation at the lower end of the characteristic curve for thin material explains why aluminum foil in a hot oven can be grasped without serious effects.

In the search for a suitable elastomer to be used in the contact probe several factors were kept in mind. The part of the probe that would be pressed against the various heated surfaces should be resilient and able to withstand high temperatures, in excess of 200°C. In the interest of fabrication, the encapsulating properties of the material would be important. Finally, the thermal properties of the elastomer should combine to yield a thermal inertia close to that of human tissue in order to satisfy the constraint associated with equation (4). There are a number of silicone rubber products commercially available that meet most of the requirements. One of these, Eccosil 4952, a silicone material that has been doped with metal compounds in order to alter its electrical or thermal characteristics, was found to have the desired thermal properties and, accordingly, this material is particularly desirable. It should be understood that any other similar elastomer with suitable characteristics can be used.

Figure 4:
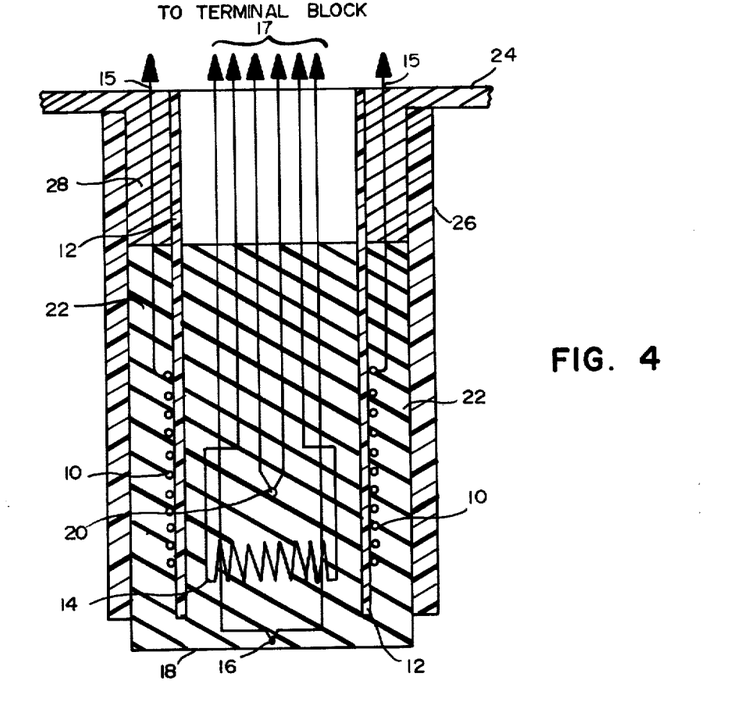
FIG. 4 is a cross-sectional view of one embodiment of a sensing probe.

Referring now to FIG. 4, heater wire 10 is wound around a thin walled inner core tube 12 of paper based bakelite, and a resistance thermometer 14 which resembles a strain-gage element is positioned along the central axis of the tube 12. The heater wire 10 and the resistance thermometer 14 form the basis of the temperature-controlling circuit that maintains the probe elastomer at a finger tissue temperature of 33°C. The U-shaped interface temperature-measuring thermocouple element 16 is positioned about 100 μm beneath the outer surface of the probe face 18, while the reference thermocouple element 20 is located about 1.5 cm back in the temperature-controlled core region. The effect of the temperature regulator on the contact temperature measurement is negligible for the contact times of interest. All of the elements are encapsulated in a cylindrical block 22 of a silicone-rubber room-temperature vulcanizing (RTV) compound such as the previously mentioned elastomer, Eccosil 4952.

A Lucite or Teflon cylindrical sleeve 26 substantially encases the cylindrical (RTV) block 22 except for its lowermost portion, and a bushing-type portion 28 of a support or frame member 24. Standard techniques, such as power stirring and vacuum-chamber processing, are used to insure that the two-part RTV material is uniform in consistency and free of air bubbles. It should be understood that the probe may be mounted in any suitable holder for comfortable hand used and is provided with cable connectors 17, which pass through channels (not shown) in the RTV block 22, for connecting the measuring thermocouple 16, reference thermocouple 20, and resistance thermometer 14 with a terminal block (not shown). Similarly, cable connectors 15,15, which pass through channels (not shown) in RTV block 22 and bushing-type portion 28 of frame 24, connect the heater wire 10 to the terminal block (not shown).

Figure 5:
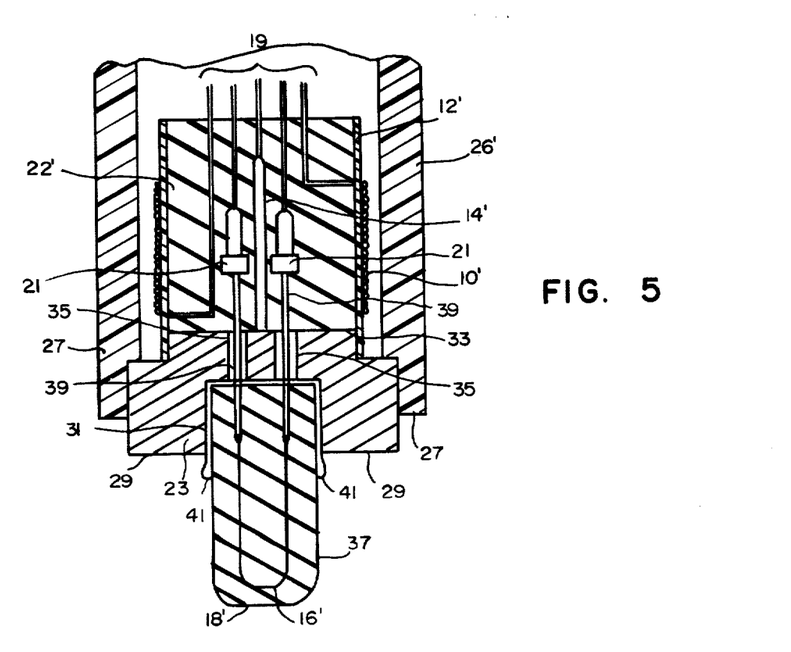
FIG. 5 is a cross-sectional view of a sensing probe having a replaceable tip.

The probe shown in FIG. 4 is primarily intended for use with the more usual flat surfaces. However, there will be situations where the hot surface in question may have an unusual surface appearance, such as a dimpled or corrugated effect, deep ridges, or curved areas. Referring now to FIG. 5, there is shown an alternate embodiment of a miniaturized probe having a heater wire 10' wound around a thin walled inner core tube 12'. A resistance thermometer 14' is positioned along the central axis of the tube 12'. As in the probe of FIG. 4, the heater wire 10' and the resistance thermometer 14' form the basis of the temperature-controlling circuit that maintains the elastomer 22' at a finger tissue temperature of 33°C. The U-shaped interface temperature-measuring thermocouple element 16' is positioned about 100 μm beneath the probe face 18' of a replaceable probe tip 37. Located on either side of the resistance thermometer 14' within the inner core tube 12' are a pair of pin sockets 21,21. The pin sockets 21,21 and resistance thermometer 14' are encapsulated within the tube 12' in a cylindrical block 22' of a RTV compound which completely fills all but a small portion of the tube 12' located nearest to the probe face 18'. The stopper-type tip holder 23 has a first cylindrical portion which fits into the unoccupied portion of tube 12' and abuts with the RTV block 22'. This probe body 22' may have a thermal inertia substantially equivalent to that of human skin. A second cylindrical portion of greater diameter sits in the lower countersunk portion 27 of the Lucite or Teflon cylindrical sleeve 26'. The outer face 29 of tip holder 23 which extends outward past the lower end of sleeve 26' includes a central bore 31 extending approximately midway through the tip holder. The inner face 33 of the tip holder 23 includes a pair of small apertures 35,35 which communicate with the central bore 31 such as Eccosil 4952. The central bore 31 accommodates a cylindrical or wedge shaped probe tip 37 of silicone rubber. Plug-in pins 39,39 partially embedded in the probe-tip 37 and extending axially outward therefrom pass through apertures 35,35. One end of the pins 39,39 mate with pin sockets 21,21 through small channels (not shown) in the RTV block 22'; while the other end of pins 39,39 are connected to the U-shaped ribbon thermocouple. The probe-tip 37 may be removably inserted in central bore 31 through the use of clips 41,41. The elastomeric probe tip 37 is thermally connected to the temperature-controlled elastomer 22' by the tip holder 23 and is thereby also held at about 33°C. Cable connectors 19 pass through channels (not shown) in the RTV block 22' and connect the pin sockets 21,21; heater wire 10'; and resistance thermometer to a terminal block (not shown).

Briefly, the sequential assembly process of the internal probe elements of the design shown in FIG. 4 begins with the mounting of the front thermocouple; this step is followed by the winding of the temperature controlling heater coil; next, the 100 ohm resistance thermometer is positioned along the central axis; the element lead wires are soldered to a terminal block that has been mounted in place; and finally, the probe structure is encapsulated in its holder tube with the special silicone-rubber medium, and the external cable and probe handle assembly are installed.

Figure 6:
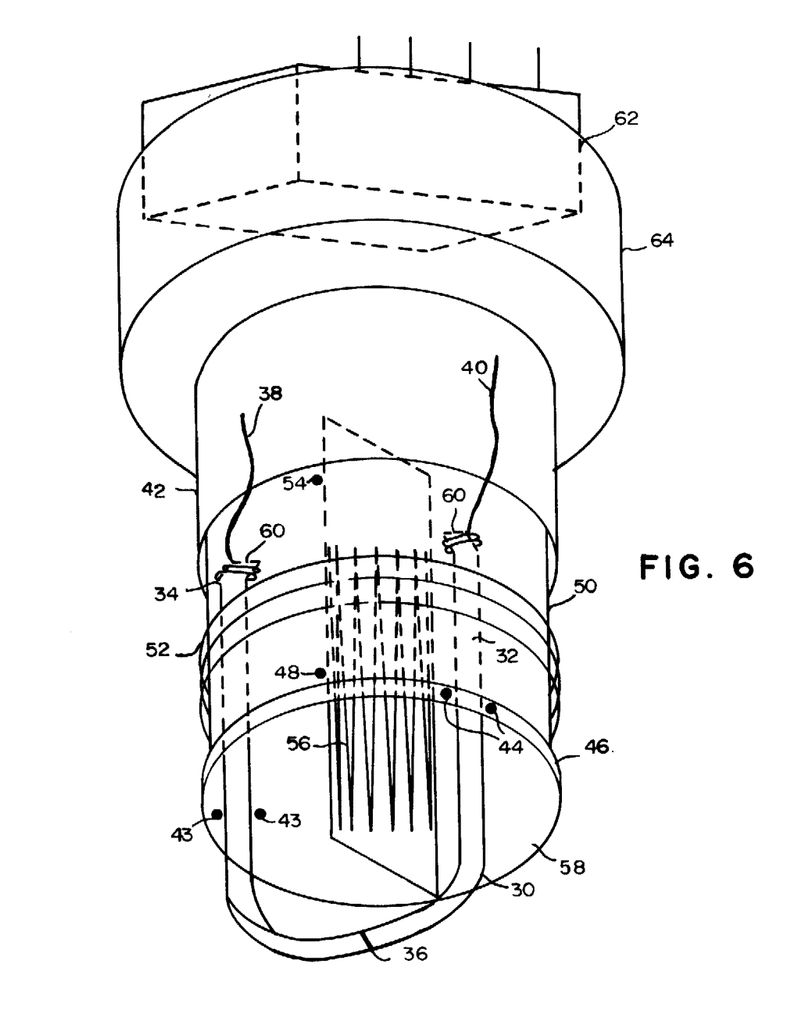
FIG. 6 is a perspective view of a sensing probe utilizing a ribbon-type thermocouple.

Referring now to FIG. 6, the assembled thermocouple ribbon element 30 is not at present commercially available from stock. Therefore, it is necessary to procure the two ribbon materials 32 and 34 of Chromel and Alumel, respectively, about 0.040 inches wide by approximately 0.003 inches thick. A thermocouple element is made from 1-inch strips of the two materials electrically spot welded with a junction overlap 36 of about 0.010 inch. The following steps may be followed for assembling the ribbon-type thermocouple of FIG. 5.

1. Trim the thermocouple element 30 to an overall length of 1⅝ inch, (thirteen-sixteenths inch each side of the welded junction). Prepare a pair of 3-inch lengths of plastic insulated (red and blue) No. 30 tinned copper wire 38 and 40, respectively, with ends bared for about one-fourth inch; insulated wire used for wire-wrap applications is suitable. Wrap the bare end of the red insulated wire 38 around the last one-eighth inch end of the Alumel ribbon 34 (the one that has magnetic attraction). Solder the connection using a stainless steel flux. Attach the blue insulated wire 40 and the Chromel ribbon 32 in the same manner. Coat the soldered connections with liquid epoxy cement and allow to dry. These connections form the reference thermocouple junctions.

Figure 8:
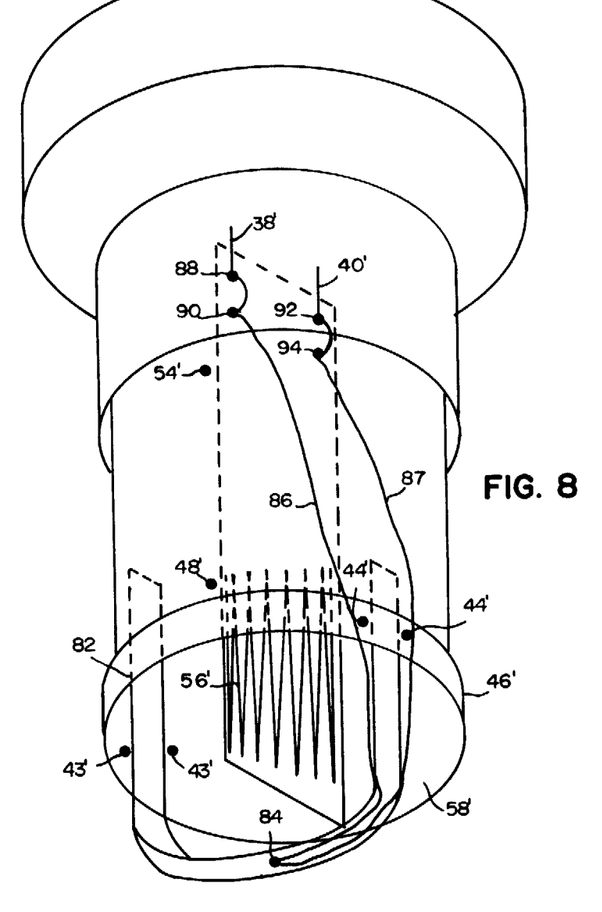
FIG. 8 is a perspective view of a sensing probe utilizing a fine wire thermocouple.

2. Carefully bend the ribbon thermocouple 30 around two sides of a ½ inch square wooden dowel with 1/16 inch radius edges to form a hairpin loop with a somewhat flattened top and slip the loop inside the probe core tube 42 and position it as shown in FIG. 8. Center the loop between the mounting holes 42,42 and 44,44 in the lip 46 of the core tube 42. Fine wire such as the No. 30 used in step 1 can be twisted through the holes in order to hold the thermocouple loop in position; the loop should extend about three thirty-seconds inch beyond the core tube end. At this point it is important to insure that the thermocouple junction 36 is precisely located uppermost at the loop tip and that the ribbon surface is correctly plane-oriented. For this step as well as others it is suggested that an illuminated optical magnifier or stereo microscope of 5 to 20 power be available for adjustment and checking during the assembly process. Cement the element in place with liquid epoxy, being careful not to coat the junction area with cement.

3. Starting from the lower hole 48 in the probe core body 50, the heater winding coil 52 is wound upward towards the upper hole 54. The winding starts with a protruding length from the lower hole of about 1½ inches beyond the bottom end of the tube, and it should terminate at the upper hole with about the same length. The winding will consist of about 14 turns for a 29-inch piece of the No. 36 insulated nichrome wire. Sharpened toothpicks may be used to hold the winding in place at the holes while liquid epoxy cement is applied to the winding and is subsequently curing.

4. Trim the sides of the DN–100 resistance thermometer element 56 slightly to achieve a sliding fit inside the probe core tube 42. Slide the element in place in a plane situated at a right angle to the mounted thermocouple ribbon 30. This will place the resistance thermometer element 56 along the center of the core tube 42 with one of its edges alongside the heater winding holes 48 and 54. The top of the resistance thermometer element 56 is set flush with the front face 58 of the probe core tube 42 and then cemented in place. Slip a five-sixteenths inch length of spaghetti over each lead, positioned near the element.

5. Bend the copper wire junctions 60,60 at the ribbon thermocouple 30 inward at an angle of about 45° as shown in FIG. 6. These connections form the reference junction which is to be embedded in the temperature-controlled RTV material.

Extra care is required in encapsulating the probe assembly to insure that the measuring thermocouple junction 36 is precisely located at the depth equivalent to the dermal layer in human skin. This is necessary if the probe is to simulate accurately the contact temperature response of a human finger. A casting assembly fixture with a built-in micrometer is used for this purpose.

6. At this stage all three of the electrical elements 30, 52 and 56 have been mounted in place with their six wire leads protruding from the back end. These leads are to be attached to a terminal block 62 in the next step. A suitable terminal junction block for the probe can be made by modifying a commercial component, a 14-pin integrated circuit socket ordinarily used with a printed-circuit board. A pair of terminals is sawed away from each end of the socket leaving 10 terminals. The four corners can be rounded with a file, and the socket is fitted in place in the back cap section 64 of the probe core tube 42. Before cementing the block in place the red and blue thermocouple lead wires 38 and 40, respectively, are threaded through the center hole; the resistance thermometer leads are each brought through an end hole; and the heater winding leads are threaded through the nearest opening along the side of the terminal block. A stainless steel flux is used with the heater winding after scraping away the insulation with fine sandpaper. Wherever possible a slack loop should be provided at each lead.

Figure 7:
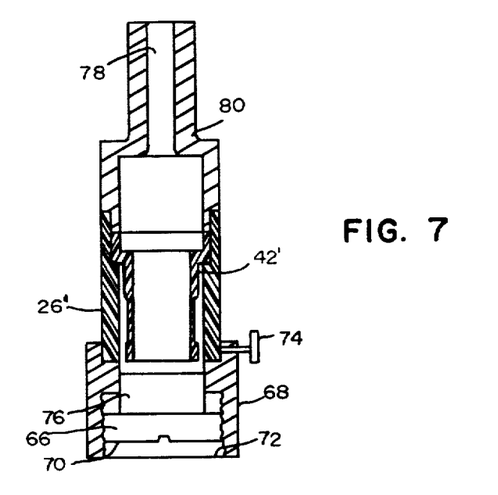
FIG. 7 is a cross-sectional view of the sensing probe of FIG. 6 during the assembly process.

7. Referring now to FIG. 7, turn the micrometer adjustment disc-screw 66 in the casting fixture 68 so that the movable brass end plate 70 rests about one-eighth inch below the ledge 72 of the casting fixture 68; this distance is to allow sufficient clearance for the 3/32 inch protrusion of the thermocouple loop tip at the probe core tube.

8. Place the Lucite probe body 26' in place in the casting fixture 68 with the internal ledge in the upright position. Make a mark on the Lucite tube at its bottom exterior that coincides with a mark made on the aluminum fixture body. Lock the Lucite tube in position with the side thumb screw 74.

9. Slide the probe core tube assembly 42' inside the Lucite probe body 26' until it seats firmly in position. The assembly can be held in place with a small toolmaker's clamp. Make a positioning mark on the inner core tube that coincides with a mark made at the inside of the Lucite tube. This set of marks and the set described in step 9 are for use in precisely repositioning the components.

10. Connect an ohmmeter between one of the thermocouple terminals and the locking screw on the side of the casting fixture.

11. Turn the micrometer adjustment screw inward at the point where the ohmmeter indicates that the thermocouple junction has contacted the micrometer plate 76. This represents zero equivalent skin depth. Back off the micrometer adjustment by the desired equivalent depth; the micrometer screw has a travel of 0.025 inches per revolution. A setting of between 0.003 and 0.004 inches depth is suggested. Note the zero and the final adjustment points on the micrometer adjustment disc-screw by means of appropriate markings.

12. Revert to Step 7 and repeat the procedure several times to insure that the final value depth adjustment can be repeated to a precision of around 0.001 inches. Remove the probe core tube assembly.

13. The encapsulating process begins with the preparation of the RTV material. The bulk portion of the material should be thoroughly mixed in its original container by means of a stirrer rod in a drill press as well as hand stirring with a heavy spoon. The substance has a thick consistency and a tendency to settle out heavily at the bottom of the container.

14. Weight out 100 grams of the stirred bulk material in a paper cup on a platform balance.

15. Add 0.5 grams of the liquid catalyst to the cup with the aid of a medicine dropper while the cup is on the scales.

16. Stir mixture vigorously with a spoon.

17. Place cup in a vacuum chamber and evacuate until a head of bubbles break at the surface of the RTV material. Break the vacuum and stir material again.

18. With the aid of a disposable funnel made from a square piece of paper having about a ¼ inch spout opening, fill the probe Lucite body that has been mounted in place in the fixture described in Step 8 to a level of about one-fourth inch below the inner ledge of the Lucite body.

19. Lower the inner probe assembly into the liquid material taking care to orient it according to Step 9. Lower the assembly slowly and finally firmly against the shoulder stop; hold in place with a small toolmaker's clamp.

20. Place the fixture in the vacuum chamber and bring vacuum down to the point where bubbles are breaking at the surface, but do not pump down further in order to avoid excessive RTV material rising into upper chamber of the probe core. Hold vacuum for about 8 minutes, then gently release the vacuum. Allow the assembly to cure in the chamber in ambient air for a period of about 24 hours.

21. After the curing period the encapsulated probe can be removed from the fixture and made ready for assembly to the handle and cable. A six-conductor cable is cut to a rough length of 50 inches. One end of the cable is threaded through the hole 78 in the probe handle 80. A cable clamp is secured above the terminal block connections for the purpose of relieving any strain on the connections after the cable has been pulled in place in the handle. The remaining end of the cable is attached to a male panel connector. During this assembly a three-eighths inch length of spaghetti should be slipped over each soldered pin connection. Finally, check the entire cable assembly with an ohmmeter for continuity of correct end-to-end connection, a check of freedom from cross-leakage, and the correct ohmic readings for each of the probe elements according to the appropriate values. The probe handle 80 is held in place as a result of its machined snug fit in the core tube assembly 42' and the Lucite probe body 26'; if looseness exists it can be remedied with a coating of cement.

It should be understood that variations of probe geometry will be considered in order to adapt the instrument to new and varied forms of thermal measurement applications.

The previous description of probe construction was centered around the use of a fabricated ribbon-type thermocouple. In the event there is difficulty in obtaining chromel and alumel material in ribbon form or if there are problems in making the welded junction, it is possible to use the commonly available round-wire thermocouples. Referring now to FIG. 8, three-mil, bare chromel-alumel thermocouples can be readily procured with a round ball welded tip. A probe can be constructed using this type of thermocouple but it will be necessary to modify the first five steps as follows:

1. (modified) The ribbon type thermocouple is physically replaced by a strip of vinyl material 82 about 1⅝ inch long, 0.04 inches wide, and 3 to 5 mils thick. Bend the vinyl strip into a flattened hairpin-like loop as described in the previous Step 2, and slip the loop inside the probe core t be 42" while centering the loop between the mounting holes 43',43' and 44',44' in the lip 46' of the core tube 42". As described for the ribbon thermocouple, the loop can be held in place with fine wire; the loop should extend beyond the core tube end by about three thirty-seconds inch. Cement the strip in place with the two-part liquid epoxy adhesive.

2. (modified) Locate and cement the thermocouple bead junction 84 on the outside centerline of the vinyl strip 82 and very precisely set the bead in its upright position at the topmost point of the strip arc. An optical magnifier or stereo microscope is necessary during this procedure. The base thermocouple leads 86 and 87 are brought down the outside surface of the vinyl strip 82, with a generous separation, to the rim of the core tube end as shown in FIG. 8 and are cemented down the inside of the core tube 42".

3. (unchanged)

4. (modified) Trim the sides of the resistance thermometer element 56' (shown in broken lines) with scissors to achieve a sliding fit inside the probe core tube 42". Remove the resistance thermometer element and make two pairs of mounting holes 88, 90 and 92, 94 in the lower end of the resistance thermometer element for use as junction points for thermocouple wire elements 86, 86 and the copper lead wires 38' and 40' as shown in FIG. 8. Loop the copper lead wires 38' and 40' through their corresponding mounting holes at the resistance element as shown in FIG. 8, and slide the element into the probe core tube 42" part-way along the center of the tube, with one of its edges along the inside of the heater winding holes 48' and 54'. At this point the bare thermocouple leads 86 and 87 are trimmed to a suitable length and are attached to the copper wire junctions. The alumel (magnetic) wire 86 is soldered to the red insulated lead 38' using the stainless steel flux and the chromel wire 87 to the blue lead 40'. Slip the resistance element in place in the tube to where it is flush with the end face 58' of the core tube and is at right angles to the vinyl thermocouple strip loop 82. Carefully check to see that the bare thermocouple wires 86 and 87 are properly routed down the inside of the tube before looping over to the end of the resistance element 56'; the wires must not touch each other. Cement the element in place as well as any loose thermocouple wires. Coat the thermocouple copper junctions with cement, and slip a five-sixteenths inch length of spaghetti over each of the resistance element leads.

5. (delete)

6. through 21. (unmodified)

Figure 9:
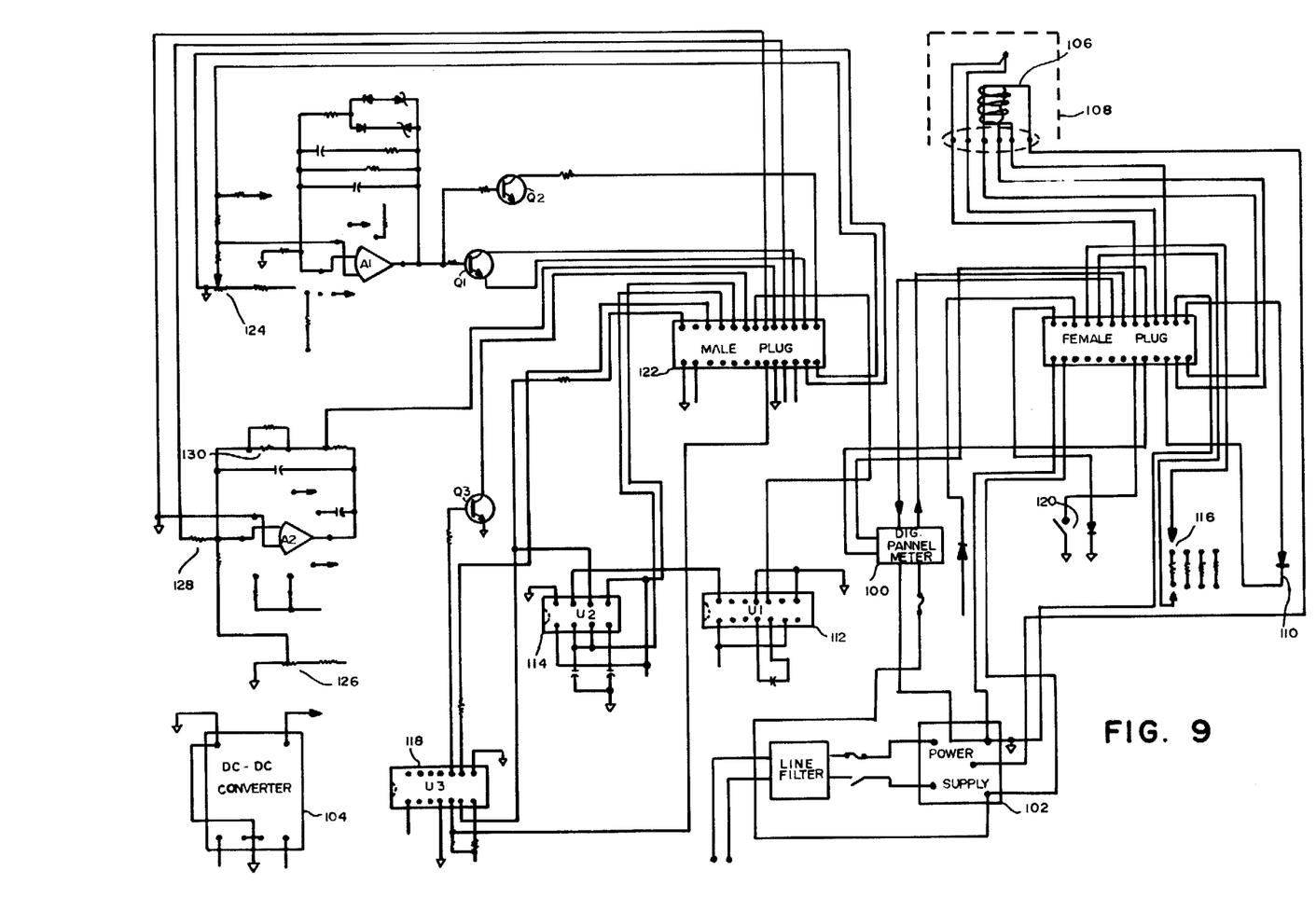
FIG. 9 is an electrical schematic diagram of the instrument.

Referring now to FIG. 9, the circuit shown is the complete electronic diagram of the instrument. The circuit can be broken down into two major sections: an analog section which is used for amplification and temperature control, and the digital circuitry which is concerned with timing and output indication. Integrated circuit components are used for both the analog and digital sections. The digital panel meter 100 is a standard, compact 3½ digit package with a full-scale sensitivity of 199.9 mV. A standard 5V, 1A supply module 102 powers the digital circuitry and the panel meter, while a 5V to ±15V converter module 104 is used with the operational amplifier circuitry.

A 100-ohm resistance thermometer 106 located within the probe 108 is used in a bridge circuit at the input of amplifier $A_1$ for the temperature regulation of the probe at 33°C. Power amplifier or transistor $Q_1$ supplies the probe heater current. In the event the probe absorbs too much heat from prolonged contact with a hot surface, the temperature controller will indicate this condition by a light emitting diode panel indicator 110 actuated by transistor $Q_2$ and the imbalance signal from $A_1$. To avoid such overheating the instrument is supplied with an aluminum plate at room temperature; after each reading the probe is brought into contact with the heat sink for a few seconds to remove the excess heat. Amplifier $A_2$ is highly stable and amplifies the chromel-alumel thermocouple output. Chromel-alumel material was chosen for its high linearity of output voltage versus temperature and for its rugged physical properties.

The function of the digital timing circuitry is to allow the selection of a precise contact measuring time with the following timing sequence. Within a few milliseconds after firm contact between the probe face and the hot surface under measurement, the digital panel meter logic circuit delivers to the pulse generator module 112 an initiating voltage step corresponding to the 40°C. crossing of the meter reading. The actual timing takes place at 114 upon receiving a pulse from 112. A front-panel switch 116 allows the selection of contact reading times of 1, 2, 4 or 8 seconds. At the end of the timing period, flip-flop stage 118 supplies a gate pulse to the digital panel meter 100 via transistor $Q_3$, which causes the last temperature reading at the meter to be "frozen" for ease of reading. Panel indicators alert the operator to the functioning of the timing sequence, and a push-button reset 120 is used to reset the meter before each new reading.

There are no scale-factor calibration controls in the instrument. Initially the electronic circuit is adjusted for a controlled temperature of 33°C. at the probe by means of a bias adjustment at the input of stage $A_1$, using an independent thermometer for measuring the probe temperature. After the controlled temperature of the probe has stabilized, a second control located at the input of stage $A_2$ is adjusted for a reading of 33° at the digital panel meter 100.

The majority of the electronic components are located on a double sided printed circuit board; the components include the analog and digital active integrated circuit modules and their associated resistors and capacitors. The +5 volt to ±15 volt dc to dc converter module 104 is located on the board, and a male connector plug 122 mounted on the card allows a disconnect route to the external leads. The board also includes the adjusting pots for the probe temperature control and the 33°C. digital panel reading.

The printed circuit board is fabricated by the standard photo-etched process using copper-laminated fibreglass board material. The resultant printed circuit was gold plated for ease in component soldering. Since the project was an engineering development effort, the active components were made to plug into socket terminals mounted on the board for ease of component exchange; however, the active components may be soldered directly in place. In the case of the operational amplifiers $A_1$, and $A_2$, spring sockets were soldered into the board.

It is important to take note of the numerous feed-through connections that have to be made between the board surfaces. In most cases the feed-through connection is made by the leads of a resistor or capacitor. It should be understood that there are printed connections on both sides of the board at some of the terminals and, therefore, care should be taken in soldering not to allow any molten solder to flow into the openings of the socket pins.

Once the instrument has been properly wired, correct value fuses have to be inserted in their locations; one fuse in the primary power line of the master 5 volt power supply and the other one in the 5 volt line that feeds the digital panel meter. Two operational amplifier modules and three digital modules have to be plugged into their locations at the printed-circuit board.

In operation, before turning on the power set the two trimming potentiometers 124 and 126 (see FIG. 9) located at the bottom side of the printed-circuit board to their maximum counter clockwise position as measured with an ohmmeter. Next, connect the probe to the main portion of the instrument by means of the panel connector; connect the power cable to rear of the instrument; turn the power switch to the ON position; and push the reset button 120.

Now, adjust the trimming resistor potentiometer 126 in a clockwise direction until the panel meter reads 33.0. This control does not affect the temperature control of the probe, but rather it establishes the system temperature datum level. However, the selected value of 33.0°C. corresponds to the controlled probe principle which in turn relates to the specified human tissue temperature of 33.0°C. Therefore, allow the device to warm up for 30 minutes and then re-adjust potentiometer 126 for a 33.0 reading if necessary.

Finally, adjust trimming resistor potentiometer 124 in a clockwise direction until the overheat light emitting diode panel indicator extinguishes. The control sets the controlled temperature of the probe. What is desired is a control temperature of 33.0°C. at the internal section of the probe. Since this measurement is difficult, an external temperature check may be used. Accordingly, the working surface of the probe is monitored with a fine-wire thermocouple used in conjunction with a temperature-indicating instrument. The potentiometer 124 is brought up clockwise in ¼-turn increments with about a 5-minute lapse between settings until the probe face temperature is measured to be between 31° and 32°C. These values correspond to the values obtained experimentally on the surface of human skin. The panel meter of the instrument will show a reading of about 32° if the probe is left resting and untouched at its face for a room temperature near 25°C.

An additional simple check on the operation of the instrument can be made at this time. If the probe face is brought into contact with a slab of brass or aluminum that has been resting at room temperature, the instrument will show a contact temperature reading that is 1° or 2° above the room temperature for a contact time of about 10 seconds. If the room temperature material that is contacted happens to be non-metallic such as wood or plastic the instrument reading will be significantly higher, perhaps only a degree or so below the 32° quiescent level. This corroborates the sensation of coldness when human contact is made with metal objects at environmental temperatures.

It should be noted that in the previous discussion in regard to the operation of the device the two circuit adjustments were concerned with the initial settings for the controlled probe temperature and for its quiescent reading. As a result, there are no scale factor or calibration controls. The measuring system was designed on the principal of a calculable transducer whose transfer function was described previously. The signal amplification is fixed by means of precision value resistors 128 and 130, at the amplifier $A_2$ in FIG. 9 so that a correct normalized value of contact temperature will be read by the digital panel meter for a probe constructed from a chromel-alumel sensing thermocouple. The validity of the readings from an instrument designed along the stated principles can be substantiated by comparing the experimental test values of temperature with those values obtained by calculations from theory as described hereinabove.

A worthwhile analysis is the plotting of experimental probe data on a graph and comparing its profile with existing curves. The broken line function in FIG. 10 was plotted from values measured with an experimental probe. Contact temperature measurements were made with the heated glass reference held precisely at a constant temperature before each of the 1, 2, 4 and 8 second contact readings. The exact value selected for the heated surface is not important although between 80° and 90°C. is suggested. It should be noted that the same $T_h$ temperature must be maintained for each of the time tests. The four values of contact temperature were plotted on the figure and for ease of comparison an arbitrary fixed value of absissa shift was added to each temperature in order to place the curve conveniently between a pair of the existing functions in the figure. Of concern here is the slope-profile of the plotted probe data.

Figure 10:
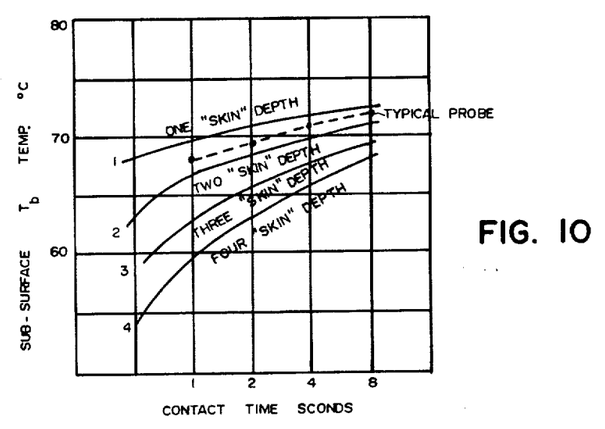
FIG. 10 is a graph showing the profiles of various skin depth temperatures.

In the example in FIG. 10 the slope of the experimental curve appears to be almost equivalent to the No. 2 function, perhaps a bit less. This means that the measuring thermocouple was encapsulated below the probe face at between one and two equivalent "skin" depths. If the plotted curve had shown a slope closer to the No. 4 function, it could be assumed that the probe sensing element was set too deep and, therefore, would not be acceptable. The contact temperature values for 8 seconds contact time would be reasonable, but the one-second readings would be much too low as indicated in the figure. Note that the ordinate values in the figure have been physically expanded in order to accentuate the slope differences. If a probe has been found to have a thermocouple element set too deep it may be possible to remedy the situation.

The RTV material can be carefully removed from the probe face by gently rubbing it against a fine grade of silicon carbide paper. Then the face should be checked for flatness with a straight edge. This procedure can be used to monitor the degree of material removed by observing the improvement in the plotted slope, but in no case should the thermocouple element be exposed. The argument presented here has been that the sensing element depth was responsible for the slope-contour of the probe response curve. While the sensing depth is the principal factor, the probe response is also influenced by the thermal time constant of the thermocouple element, and it probably is this added factor that accounts for the typical probe having a response slope somewhat greater than expected even though the thermocouple element may have been set precisely to a single "skin" depth. Presently, the small discrepancies in sensing depth can be neglected, since the error involved is within the assigned accuracy of the instrument. Also, there is bound to be considerable debate concerning the correct skin depth, since the dermal layer varies from one person to another as well as from one part of the body to another.

The fact that a probe has been tested in the manner described and found to have its sensing element correctly set should not imply that all future measurement data could not shown an anomalous behavior as indicated by an extra-large slope in the time-response curve. The previous test was conducted on the fused-silica reference surface, which can be considered a nearly ideal semi-infinite-length thermal mass. There will be heated surfaces encountered in practice that are far from ideal and whose contact temperature as a function of contact time is impractical to predict from theory. In fact, it is the contact-time of the instrument described above that allows a correct reading to be made with these thermally complex cases.

Figure 11:
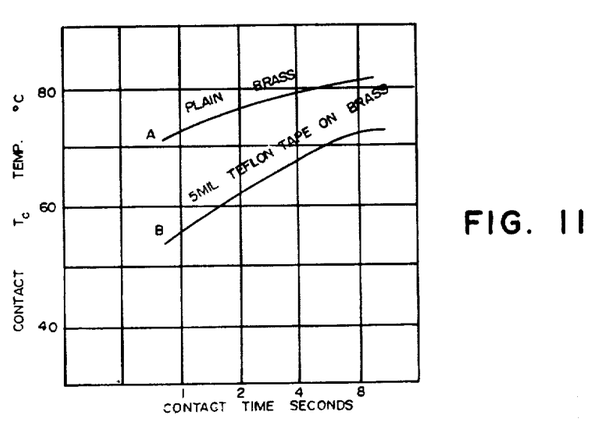
FIG. 11 is a graph showing the effect of thin plastic on heated brass.

The results of one such situation is shown in FIG. 11. A thick piece of brass was maintained at a constant 83°C. temperature, and the instrument made a series of contact-temperature readings at the contact times which are plotted in curve A. A portion of the brass surface was covered with a piece of 5-mil Teflon tape, and the tests were repeated on this surface. The second test data is plotted in curve B, and it is obvious that there is a much larger slope to curve B, especially in the 1 and 2 second contact-time area. Though the plastic film is thin, its lower thermal conductivity has influenced the transport of heat in an unusual time-dependent characteristic. This example has potential practical significance since it suggests that the makers of consumer products can use the instrument as a design tool in order to meet safety specifications. The simple expedient of covering a hot surface with a thin coating of plastic can significantly reduce the contact temperature at all contact times and especially so at the short contact times. This latter point is important since the situations of brief contact with hot surfaces is uniquely dangerous and is of increasing concern.

The electronic details of the instrument and some features of the probe could have been simplified by designing the measuring system for a fixed contact-measuring time of, say, 4 or 8 seconds. As well as reducing the circuit complexity, the fixed longer measuring time would have reduced depth positioning tolerance of the thermocouple element in the probe to some degree since the thermal gradient from probe face to sensing element becomes quite small at contact times above 4 seconds. With a single measurement at the longer contact time it would be possible to predict the one-second contact time temperature by an extrapolation of the data using scale factors taken from curve 1 or 2 in FIG. 10. For the majority of applications the results would be valid, but there is the probability that a heated surface such as the one described in conjunction with FIG. 1 might be encountered. As noted previously it is possible with non-ideal thermal masses to have anomalous readings at one second contact. There are significant operational advantages with the short measuring periods. A larger number of points at a surface in question can be covered than with a longer measuring time. Also the repeated measurements at the longer periods require a correspondingly long time interval between readings in order to remove the excess heat from the probe with the aid of the passive plate. It is anticipated that the routine manner for using the instrument will be to make a series of quick measurements of a heated surface in question with the instrument set to a one-second contact time. Whenever a suspicious temperature has been read the suggested procedure would be to make a series of readings at the location at all the contact times. It might be desirable to make a simple graph plot of this data for the record and subsequent study. Accuracy of the data is likely to be better for a 4-second measurement than at 1 second, the smaller contact time depending a greater dexterity of the operator.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the disclosed embodiment.

It is to be understood that the phraseology or terminology employed herein is for the purposes of description and not of limitation.

What is claimed is:

1. A thermesthesiometer for measuring the temperature that would exist at the basal layer of the skin of a human finger or the like if the finger were to contact a potentially hazardous hot surface, comprising:
 a finger-like probe of elastomeric material having a thermal inertia substantially equal to that of human finger tissue, said probe having a face for contacting said hot surface;
 temperature maintaining means disposed within said finger-like probe for maintaining the bulk of said elastomeric material at a temperature substantially equal to that of human finger tissue;
 temperature measuring means for measuring the temperature of said elastomeric probe beneath said face at a distance substantially equal to that of the basal layer of human finger skin;
 timing signal generating means responsive to an output from said temperature measuring means which slightly exceeds the output corresponding to said human finger tissue temperature for generating a timing signal of preselected duration; and
 temperature displaying means responsive to the termination of said timing signal for fixedly displaying the then-existing temperature output from said temperature measuring means.

2. The thermesthesiometer of claim 1 wherein said temperature maintaining means comprises:
 a resistance thermometer; and
 a heater wire wound around said resistance thermometer.

3. The thermesthesiometer of claim 1 wherein said temperature measuring means is a thermocouple.

4. The thermesthesiometer of claim 1 wherein said temperature measuring means is a ribbon-type thermocouple.

5. The thermesthesiometer of claim 1 wherein said temperature measuring means is a fine wire thermocouple.

6. The thermesthesiometer of claim 1 wherein said temperature displaying means comprises a digital panel meter.

7. The thermesthesiometer of claim 1 wherein said signal generating means comprises a switch means for selectively switching between a readout time of 1, 2, 4 and 8 seconds.

8. A thermesthesiometer for indicating the temperature that would be experienced if human contact were made with a heated surface comprising:
 a replaceable probe tip having an inner surface and an outer surface said outer surface adapted to be placed in contact with the heated surface, said probe tip having a thermal inertia substantially equal to that of human skin;
 a tip holder having a first and second surface and a pair of apertures which communicate between said first and second surfaces, said first surface including means for releasably securing said inner surface of said probe tip;
 a probe body in substantial abutment with said second surface of said tip holder, said probe body having a thermal inertia substantially equal to that of human skin;
 temperature maintaining means disposed within and about said probe body for maintaining the temperature of said probe body and said probe tip substantially equal to that of human skin;
 temperature measuring means disposed beneath said outer surface of said probe tip at a distance substantially equal to that of the basal layer of human skin for measuring the contact temperature of the heated surface;
 a pair of connecting pins each having a first and second end, said first ends being connected to said temperature measuring means, said second ends extending outeard from the inner surface of said probe tip in substantial alignment with said apertures of said tip holder when said probe tip is secured by said tip holder;
 socket means disposed within said probe body for receiving said second ends of said connecting pins when said probe tip is secured by said tip holder; and
 readout means connected to said temperature measuring means for visually displaying the contact temperature of the heated surface at a predetermined reading time after said outer surface of said probe tip is placed in contact with the heated surface.

* * * * *